(12) United States Patent
Miller

(10) Patent No.: US 11,279,282 B2
(45) Date of Patent: Mar. 22, 2022

(54) METHODS AND SYSTEMS FOR ALIGNING A VEHICLE WITH A TRAILER

(71) Applicant: Robert Bosch GMBH, Stuttgart (DE)

(72) Inventor: James Stephen Miller, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 16/500,739

(22) PCT Filed: Apr. 18, 2018

(86) PCT No.: PCT/EP2018/059920
§ 371 (c)(1),
(2) Date: Oct. 3, 2019

(87) PCT Pub. No.: WO2018/192984
PCT Pub. Date: Oct. 25, 2018

(65) Prior Publication Data
US 2020/0101897 A1 Apr. 2, 2020

Related U.S. Application Data

(60) Provisional application No. 62/487,387, filed on Apr. 19, 2017.

(51) Int. Cl.
*B60R 1/00* (2006.01)
*G06T 7/579* (2017.01)
(Continued)

(52) U.S. Cl.
CPC ............... *B60R 1/00* (2013.01); *B60Q 9/008* (2013.01); *B60W 30/18036* (2013.01);
(Continued)

(58) Field of Classification Search
CPC ............... B60R 1/00; B60R 2300/308; B60R 2300/808; G06T 7/579; G06T 7/75;
(Continued)

(56) References Cited

U.S. PATENT DOCUMENTS 7,204,504 B2   4/2007 Gehring et al.
7,429,051 B2   9/2008 Bauer et al.
(Continued)

FOREIGN PATENT DOCUMENTS

DE         10302545 A1    7/2004
DE    102004029129 A1    1/2006
(Continued)

OTHER PUBLICATIONS

International Search Report and the Written Opinion of the International Searching Authority, dated Sep. 10, 2018; Intl. Appl. No. PCT/EP2018/059920.

*Primary Examiner* — Yazan A Soofi
*Assistant Examiner* — Naeem Taslim Alam
(74) *Attorney, Agent, or Firm* — Michael Best & Friedrich LLP

(57) ABSTRACT

Methods and systems for aligning a vehicle with a trailer. One system includes an image sensor configured to collect a plurality of images. The system also includes an electronic processor configured to receive the plurality of images from the image sensor. The electronic processor is also configured to determine a three-dimensional model of an area surrounding the vehicle using the plurality of images. The electronic processor is also configured to control the vehicle to automatically perform a vehicle maneuver to align the vehicle with the trailer based on the three-dimensional model of the area surrounding the vehicle. The electronic processor is also configured to determine when the vehicle is aligned with the trailer and stop the vehicle from automatically performing the vehicle maneuver when the vehicle is aligned with the trailer.

18 Claims, 3 Drawing Sheets

(51) Int. Cl.
*G06T 7/73* (2017.01)
*B60Q 9/00* (2006.01)
*B60W 30/18* (2012.01)
*B60W 50/14* (2020.01)
*G06T 11/00* (2006.01)
*B60D 1/36* (2006.01)

(52) U.S. Cl.
CPC ............. *B60W 50/14* (2013.01); *G06T 7/579* (2017.01); *G06T 7/75* (2017.01); *G06T 11/00* (2013.01); *B60D 1/36* (2013.01); *B60R 2300/308* (2013.01); *B60R 2300/808* (2013.01); *B60W 2050/146* (2013.01); *B60W 2420/42* (2013.01); *G06T 2207/10028* (2013.01); *G06T 2207/30252* (2013.01)

(58) Field of Classification Search
CPC ........... G06T 11/00; G06T 2207/10028; G06T 2207/30252; B60Q 9/008; B60W 30/18036; B60W 50/14; B60W 2050/146; B60W 2420/42; B60D 1/36
See application file for complete search history.

(56) References Cited

U.S. PATENT DOCUMENTS

| | | | | |
|---|---|---|---|---|
| 8,027,029 B2* | 9/2011 | Lu | ................. | B60R 1/00 356/4.01 |
| 8,191,915 B2 | 6/2012 | Freese, V. et al. | | |
| 9,457,632 B1 | 10/2016 | Windeler et al. | | |
| 10,214,062 B2* | 2/2019 | Huger | ................. | G06K 9/00791 |
| 10,571,562 B2* | 2/2020 | Wodrich | ................. | G01S 13/931 |
| 2002/0149673 A1* | 10/2002 | Hirama | ................. | B60R 1/00 348/118 |
| 2010/0096203 A1* | 4/2010 | Freese, V | ................. | B60D 1/58 180/167 |
| 2010/0324770 A1 | 12/2010 | Ramsey et al. | | |
| 2011/0001614 A1* | 1/2011 | Ghneim | ................. | G06F 3/0481 340/435 |
| 2011/0175752 A1* | 7/2011 | Augst | ................. | B60R 1/00 340/905 |
| 2013/0226390 A1* | 8/2013 | Luo | ................. | B60D 1/36 701/25 |
| 2014/0012465 A1* | 1/2014 | Shank | ................. | B62D 15/0285 701/36 |
| 2014/0358429 A1* | 12/2014 | Shutko | ................. | B60D 1/245 701/458 |
| 2015/0251693 A1* | 9/2015 | Lavoie | ................. | B60W 10/18 701/41 |
| 2015/0321697 A1 | 11/2015 | Lu et al. | | |
| 2016/0075281 A1 | 3/2016 | Singh et al. | | |
| 2016/0092755 A1 | 3/2016 | Fairfield et al. | | |
| 2016/0119539 A1* | 4/2016 | Tan | ................. | G01S 5/0284 348/148 |
| 2016/0288601 A1 | 10/2016 | Gehrke et al. | | |
| 2016/0378118 A1* | 12/2016 | Zeng | ................. | B60D 1/62 701/28 |
| 2017/0004379 A1 | 1/2017 | Ramalingam et al. | | |
| 2017/0151846 A1* | 6/2017 | Wuergler | ................. | B60D 1/62 |
| 2018/0001721 A1* | 1/2018 | Huger | ................. | G06T 7/11 |
| 2018/0141397 A1* | 5/2018 | Opitz | ................. | B60D 1/36 |
| 2018/0208187 A1* | 7/2018 | Lewis | ................. | G08G 1/165 |
| 2018/0215382 A1* | 8/2018 | Gupta | ................. | G08G 1/166 |
| 2018/0251153 A1* | 9/2018 | Li | ................. | B60D 1/62 |
| 2018/0276839 A1* | 9/2018 | Diessner | ................. | B60R 1/00 |

FOREIGN PATENT DOCUMENTS

| | | |
|---|---|---|
| DE | 112014004554 T5 | 7/2016 |
| EP | 1238577 A1 | 9/2002 |

* cited by examiner

METHODS AND SYSTEMS FOR ALIGNING A VEHICLE WITH A TRAILER

SUMMARY

Backing up a vehicle to a trailer can be a tedious process for a driver since it requires a precise alignment of a hitch ball of the vehicle underneath a trailer coupler. Existing and proposed methods for trailer hitch guidance using a rear view camera rely on either the driver selecting the trailer coupler location in an image or using a classifier to identify the trailer coupler. The first method may have poor performance due to the driver not selecting the correct location in the image. The second method fails when the trailer coupler is not recognized by the classifier or is not correctly localized in the image. For example, there are a number of distinctive trailer coupler types as well as a large variation in the appearance of trailer couplers. A classifier approach may not be able to identify all of the variations of trailer couplers or may require significant computational effort and large training datasets. Additionally, the location of the trailer coupler in the image does not determine the distance to the trailer coupler or the height of the trailer coupler. Additional methods must be applied to obtain the distance for proper alignment and a check for a possible collision with the hitch ball due to a difference in height.

Accordingly, one embodiment provides a system for aligning a vehicle with a trailer. The system includes an image sensor configured to collect a plurality of images. The system also includes an electronic processor configured to receive the plurality of images from the image sensor. The electronic processor is also configured to determine a three-dimensional model of an area surrounding the vehicle using the plurality of images. The electronic processor is also configured to control the vehicle to automatically perform a vehicle maneuver to align the vehicle with the trailer based on the three-dimensional model of the area surrounding the vehicle. The electronic processor is also configured to determine when the vehicle is aligned with the trailer and stop the vehicle from automatically performing the vehicle maneuver when the vehicle is aligned with the trailer.

Another embodiment provides a method for aligning a vehicle with a trailer. The method includes receiving, with an electronic processor, a plurality of images from an image sensor. The method also includes determining, with the electronic processor, whether the vehicle is within a starting region with respect to the trailer. The method also includes determining, with the electronic processor, a three-dimensional model of an area surrounding the vehicle using the plurality of images. The method also includes controlling, with the electronic processor, the vehicle to automatically perform a vehicle maneuver based on the three-dimensional model of the area surrounding the vehicle. The method also includes determining, with the electronic processor, when the vehicle is aligned with the trailer. The method also includes stopping, with the electronic processor, the vehicle from automatically performing the vehicle maneuver when the vehicle is aligned with the trailer.

Other aspects of various embodiments will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
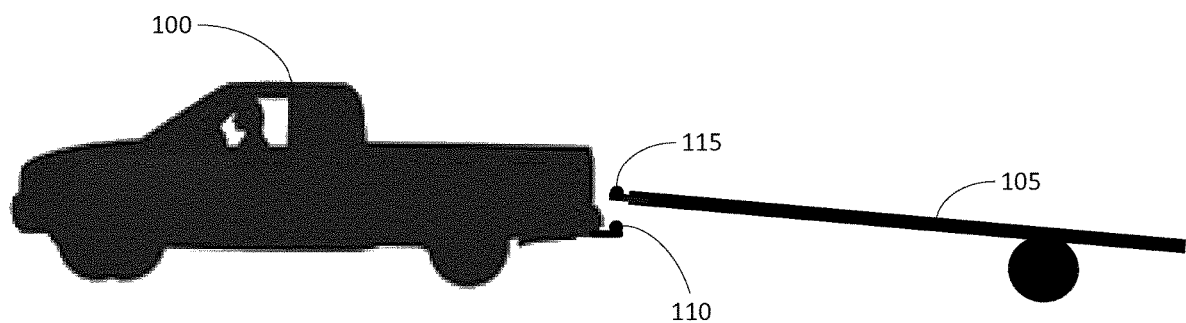
FIG. 1 illustrates a vehicle aligning with a trailer.

FIG. 1 illustrates a vehicle 100 and a trailer 105. In the example shown, the vehicle 100 is aligned with the trailer 105 such that a hitch ball 110 of the vehicle is directly below a trailer coupler 115 of the trailer 105. Accordingly, when the trailer 105 is lowered, the trailer coupler 115 will receive the hitch ball 110. As described above, backing up the vehicle 100 to the trailer 105 can be a tedious process for a driver since it requires a precise alignment of the hitch ball 110 of the vehicle 100 underneath the trailer coupler 115.

Figure 2:
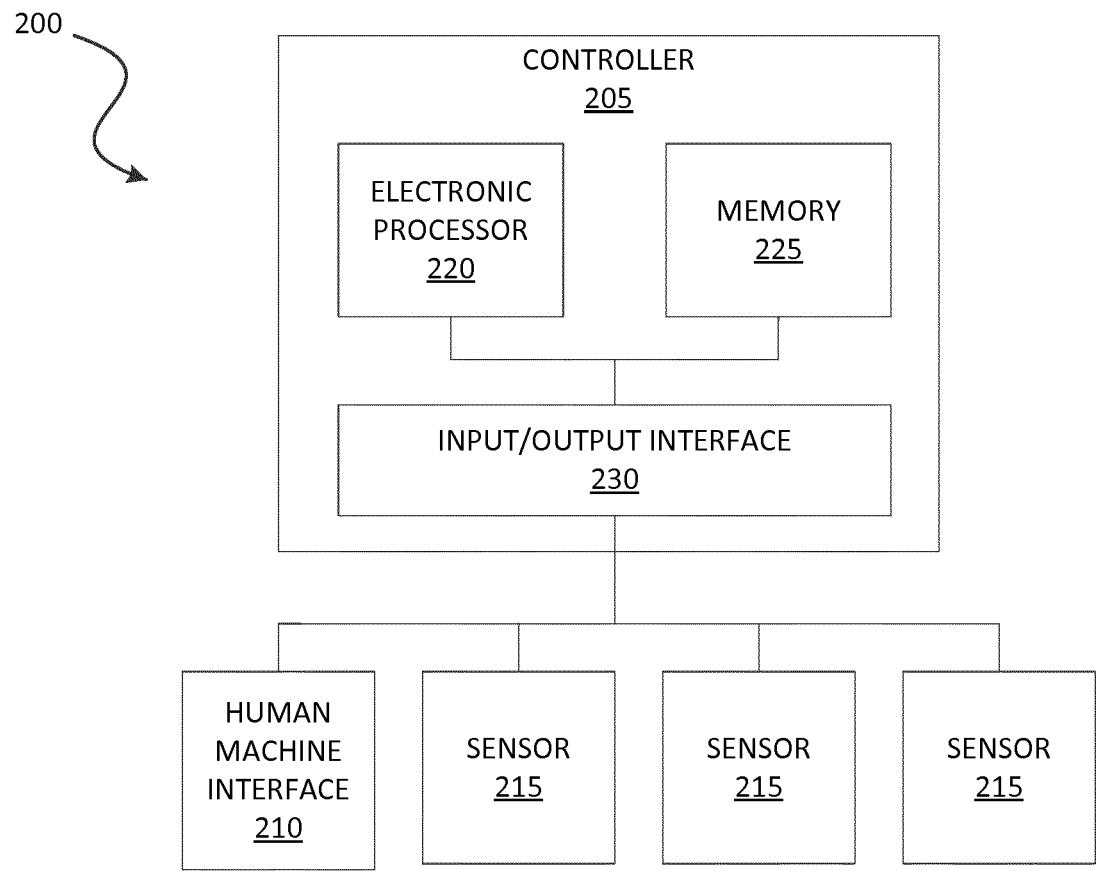
FIG. 2 illustrates a system of aligning a vehicle with a trailer in accordance with some embodiments.

FIG. 2 illustrates a system 200 for aligning the vehicle 100 with the trailer 105 according to some embodiments. As illustrated in FIG. 2, the system 200 includes a controller 205, a human machine interface 210, and an image sensor 215. In some embodiments, the system 200 includes fewer, additional, or different components than those illustrated in FIG. 2 in various configurations and may perform additional functionality than the functionality described herein.

The controller 205 may be a preexisting controller of the vehicle 105. For example, the controller 205 may be a controller associated with a braking system, an engine control system, an autonomous vehicle system, or another vehicle system of the vehicle 100. However, in some embodiments, the controller 205 is separate from other preexisting vehicle systems. For example, the controller 205 may be included in a complimentary system (for example, the system 200) to a preexisting vehicle system. Accordingly, in such embodiments, the controller 205 (for example, the system 200) functions as a central location that collects information (for example, a plurality of images, vehicle odometry information, and the like) from various sources, such as the image sensor 215, one or more additional vehicle sensors, another vehicle system, or a combination thereof. Based on the information collected, the controller 205 may transmit control signals to the other preexisting vehicle systems for controlling the vehicle 100 to perform a vehicle maneuver, such as a vehicle maneuver to align the vehicle 100 with the trailer 105.

In the example illustrated in FIG. 2, the controller 205 includes an electronic processor 220 (for example, a microprocessor, an application specific integrated circuit, or another suitable electronic device), a memory 225 (for example, one or more non-transitory computer-readable storage mediums), and a input/output interface 230. The electronic processor 220, the memory 225, and the input/output interface 230 communicate, over one or more data connections or buses, or a combination thereof. The controller 205 illustrated in FIG. 2 represents one example, and, in some embodiments, the controller 205 includes fewer, additional, or different components in different configurations than illustrated in FIG. 2. Also, in some embodiments, the controller 205 performs functionality in addition to the functionality described herein.

The electronic processor 220 is configured to retrieve instructions from the memory 225 and execute instructions to perform a set of functions, including the methods described herein. For example, in some embodiments, the electronic processor 220 executes instructions for controlling vehicle steering, braking, and propulsion systems to align the vehicle 100 with the trailer 105. The memory 225 may include combinations of different types of memory, such as read-only memory ("ROM"), random access memory ("RAM"), or another non-transitory computer readable medium. As noted above, the memory 225 stores instructions executed by the electronic processor 220. The memory 225 may also store data, such as a plurality of images collected by the image sensor 215. The memory 225 may also store firmware, one or more applications, program data, filters, rules, one or more program modules, and other executable instructions or data.

The input/output interface 230 allows the controller 205 to communicate with devices external to the controller 205 (for example, receive input from and provide output to devices external to the controller 205 directly or indirectly). In one example, the controller 205 communicates with the human machine interface 210, the image sensor 215, or a combination thereof through the input/output interface 230. In some embodiments, the input/output interface 230 includes a port for receiving a wired connection to the human machine interface 210, the image sensor 215, or a combination thereof. Alternatively or in addition, the input/output interface 230 includes a transceiver for establishing a wireless connection to the human machine interface 210, the image sensor 215, or a combination thereof. Alternatively or in addition, the input/output interface 230 communicates with a communication bus (for example, a controller area network ("CAN")) to indirectly communicate with, for example, the human machine interface 210, the image sensor 215, or a combination thereof.

As noted above, the system 200 includes an image sensor 215, for example, a video camera. In some embodiments, the image sensor 215 is a preexisting back-up camera of the vehicle 100. The image sensor 215 detects a plurality of images associated with an area surrounding the vehicle 100. When the image sensor is a back-up camera the image sensor 215 is mounted on the rear of vehicle 100 and has a rear facing field of view with respect to the vehicle 100. Accordingly, the image sensor 215 is configured to detect a plurality of images associated with an area directly behind the vehicle 100.

In some embodiments, the image sensor 215 includes a wide-angle lens. When so configured, the image sensor 215 may include image processing circuitry to transform wide-angle or omnidirectional views into rectilinear images. In other embodiments, the image sensor 215 is a stereo camera that captures three-dimensional information of a scene behind the vehicle 100. In either of these embodiments, the image sensor 215 is configured to track objects within the plurality of images and transmit information regarding the position and movement of the objects within the plurality of images (via the input/output interface 230) to the electronic processor 220. In other embodiments, the electronic processor 220 performs image processing, object tracking, object detection, and scene mapping in conjunction with the image sensor 215. Alternatively or in addition to, the image sensor 215 operates in conjunction with other sensors, for example, a time of flight camera, a lidar sensor, a radar sensor, an ultrasound detector, or a combination thereof to determine a three-dimensional model of an area surrounding the vehicle 100 (as described in more detail below).

The system 200 also includes the human machine interface 210. The human machine interface 210 is configured to receive input from and provide output to a user of the vehicle 100. For example, the human machine interface 210 includes a display, such as a touchscreen display, that displays the plurality of images detected by the image sensor 215 to a user of the vehicle 100. In some embodiments, the human machine interface 210 also displays additional information to the user of the vehicle 100, such as instructions for aligning the vehicle 100 with the trailer 105, a visual representation of a starting region with respect to the trailer 105 (as described in greater detail below), and the like. The human machine interface 210 also includes one or more input mechanisms, such as one or more user-selectable buttons, knobs, sliders, and the like, for receiving input from the user of the vehicle 100. For example, a user of the vehicle 100 may use the one or more input mechanisms of the human machine interface 210 to input a request to initiate alignment of the vehicle 100 with the trailer 105. In some embodiments, the human machine interface 210 is a preexisting component of the vehicle 100. For example, the human machine interface 210 may be part of an infotainment system, a navigation system, or another system of the vehicle 100.

As noted above, in some embodiments, the system 200 includes additional or different components than illustrated in FIG. 2. For example, the system 200 may include one or more additional vehicle sensors associated with the vehicle 100, for example, a steering angle sensor, a wheel position sensor, a wheel speed sensor, a global positioning system (GPS) indicator, and the like. The one or more additional vehicle sensors may be configured to provide position and movement information (for example, vehicle odometry information) relating to the vehicle 100. The one or more additional sensors provide the vehicle odometry information to the controller 205. Based on the vehicle odometry information received from the one or more additional sensors, the electronic processor 220 of the controller 205 may determine a position, a heading, and a motion of the vehicle 100. Accordingly, the electronic processor 205 may be configured to determine the position and a change of position over time based on the vehicle odometry information. Based at least in part on such determinations, the electronic processor 220 may determine a path of travel of the vehicle 100 and movements of objects relative to the vehicle 100 in a three-dimensional model of an area surrounding the vehicle 100.

Figure 3:
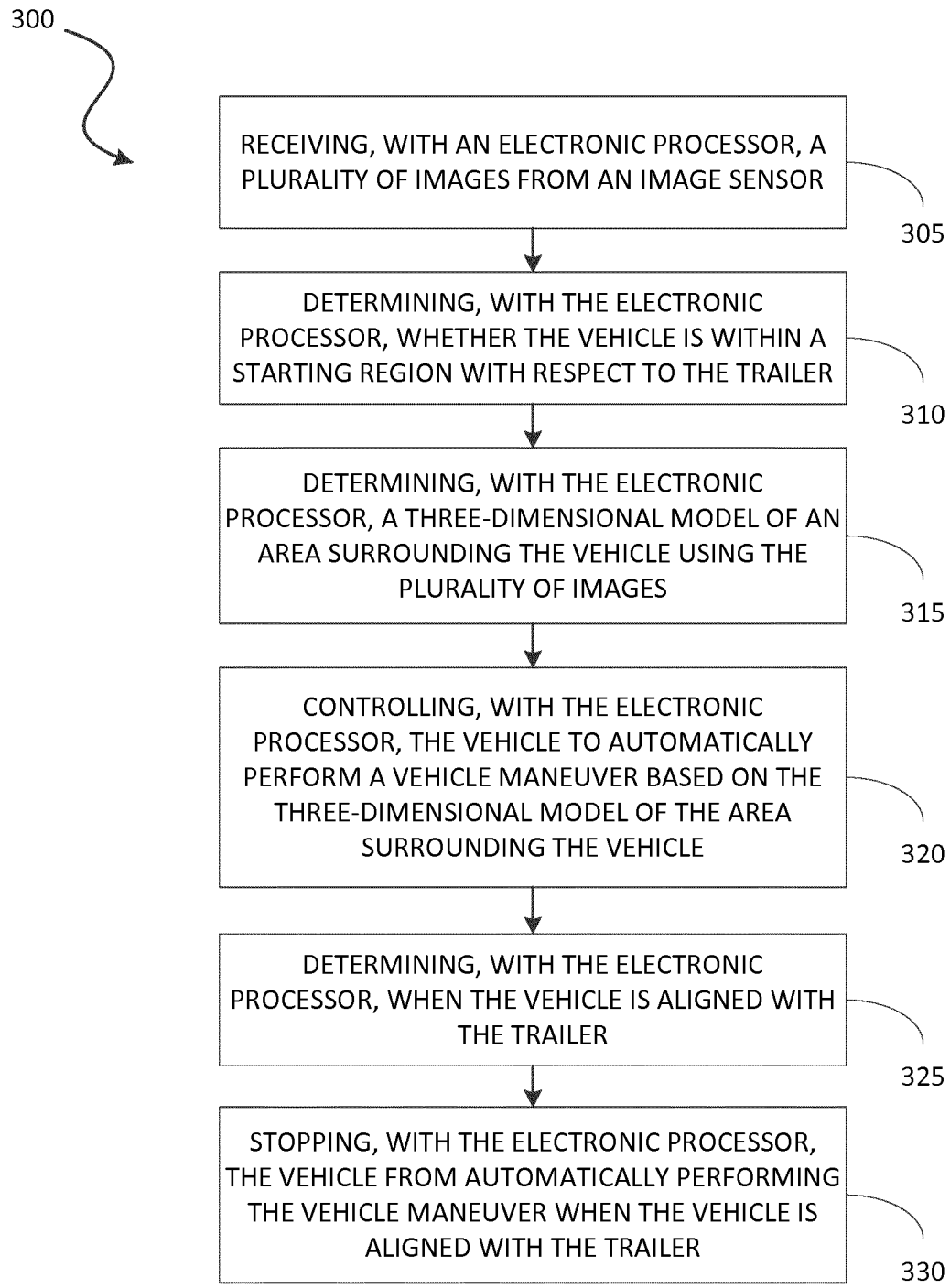
FIG. 3 is a flowchart illustrating a method for aligning a vehicle with a trailer performed by the system of FIG. 2 in accordance with some embodiments.

As noted above, the electronic processor 220 of the controller 205 executes instructions for aligning the vehicle 100 with the trailer 105. In particular, the electronic processor 205 executes instructions to perform the method 300 illustrated in FIG. 3 for aligning the vehicle 100 with the trailer 105. As illustrated in FIG. 3, the method 300 includes receiving, with the electronic processor 220, a plurality of images from the image sensor 215 (at block 305). The electronic processor 220 receives the plurality of images from the image sensor 215 via the input/output interface 230 of the controller 205. As noted above, the plurality of images are associated with an area surrounding the vehicle 100.

The electronic processor 220 determines whether the vehicle 100 is within a starting region with respect to the trailer 105 (at block 310). The starting region represents a region in which the vehicle 100 is close enough to the trailer 105 to begin alignment of the vehicle 100 with the trailer 105. In other words, in some embodiments, the electronic processor is configured to align the vehicle 100 with the trailer 105 only when the vehicle 100 is within a predetermined range of the trailer 105. For example, the electronic processor 220 aligns the vehicle 100 when the vehicle 100 (for example, the trailer coupler 110) is located at a distance of approximately one to five meters and at approximately +/−20 degrees of a centerline of the vehicle 100.

In some embodiments, the electronic processor 220 generates a visual representation of the starting region and transmits the visual representation of the starting region to the human machine interface 210 for display to a user of the vehicle 100. For example, the human machine interface 210 displays the visual representation as a highlighted area overlaid on the plurality of images displayed to the user of the vehicle 100. As a further example, the human machine interface 210 displays the visual representation as a cone-shaped area defined by one to five meters at +/−20 degrees. Based on whether the vehicle 100 is within the starting region, the electronic processor 220 may modify the visual representation of the starting region. In one example, when the vehicle 100 is within the starting region, the visual representation of the starting region is displayed in a first color, such as green. When the vehicle 100 is not within the starting region, the visual representation of the starting region is displayed in a second color, such as red. In some embodiments, the electronic processor 220 generates and transmits instructions for display to a user of the vehicle 100 via the human machine interface 210 for positioning the vehicle 100 within the starting region. In one example, the human machine interface 210 displays the instructions to turn a steering wheel of the vehicle 100 in a clockwise or counter-clockwise direction or to continue reversing the vehicle 100 towards the trailer 105.

When the electronic processor 220 determines that the vehicle 100 is within the starting region, the electronic processor 220 then determines a three-dimensional model of an area surrounding the vehicle 100 using the plurality of images (at block 315). In some embodiments, the three-dimensional model of the area surrounding the vehicle 100 is a three-dimensional point cloud. The electronic processor 220 may determine the three-dimensional model of the area surrounding the vehicle 100 by analyzing the plurality of images using a structure-from-motion technique. Structure-from-motion techniques match features from multiple images taken from different locations to determine a three-dimensional location of a feature (for example, the trailer 105) as well as a camera motion. In some embodiments, the electronic processor 220 identifies one or more objects within the plurality of images based on the three-dimensional model and the vehicle odometry information.

The electronic processor 220 controls the vehicle 100 to automatically perform a vehicle maneuver based on the three-dimensional model of the area surrounding the vehicle 100 (at block 320). The electronic processor 220 controls the vehicle by controlling vehicle steering, acceleration, braking, or a combination thereof to align the vehicle 100 with the trailer 105. For example, the electronic processor 220 may control the steering and acceleration of the vehicle 100 to align the vehicle 100 with the trailer 105.

In some embodiments, the electronic processor 220 is also configured to process a manual alignment input from the user of the vehicle 100. The manual alignment input from the user of the vehicle 100 may include a manual steering input, a manual acceleration input, a manual braking input, or a combination thereof. When the electronic processor 220 receives a manual alignment input from the user of the vehicle 100, the electronic processor 220 controls the vehicle 100 to perform the vehicle maneuver based on the three-dimensional model and the manual alignment input. In other words, a user of the vehicle 100 may override the vehicle maneuvers controlled by the electronic processor 220. For example, the user of the vehicle 100 may control the brake and acceleration of the vehicle 100 while the steering of the vehicle 100 is automatically controlled (by the electronic processor 220).

In some embodiments, the electronic processor 220 identifies one or more features or objects within the three-dimensional model. In particular, in some embodiments, the electronic processor 220 assumes that an object closest to the vehicle is the trailer 105 (for example, the trailer coupler 115). Based on this assumption, the electronic processor 200 controls the vehicle 100 to perform a vehicle maneuver to align the vehicle 100 (for example, the hitch ball 110) with the trailer 105 (for example, the trailer coupler 115), as illustrated in FIG. 1.

While the vehicle 100 is controlled to automatically perform the vehicle maneuver, the electronic processor 220 receives additional images from the image sensor 215 and updates the three-dimensional model based on the additional images received from the image sensor 215. Based on the updated three-dimensional model, the electronic processor 220 modifies or alters the vehicle maneuver performed by the vehicle 100.

The electronic processor 220 also determines when the vehicle 100 is aligned with the trailer 105 (at block 325). For example, the electronic processor 220 determines that the vehicle 100 is aligned with the trailer 105 (as illustrated in FIG. 1) based on the updated three-dimensional model. The electronic processor 220 stops the vehicle 100 from automatically performing the vehicle maneuver when the vehicle 100 is aligned with the trailer (at block 330).

Alternatively or in addition to, in some embodiments, the electronic processor 220 receives, from the human machine interface 210, a user input initiating an alignment of the vehicle 100 with the trailer 105 prior to receiving the plurality of images from the image sensor 215. In other words, a user inputs a request to initiate the alignment of the vehicle 100 with the trailer 105 using the human machine interface 210. In response to receiving the user input to initiate the alignment of the vehicle 100 with the trailer 105, the electronic processor 220 initiates the alignment of the vehicle 100 with the trailer 105. In some embodiments, the electronic processor 220 provides an indication to the human machine interface 210 that an alignment of the vehicle 100 with the trailer 105 is initiated. The human machine interface 210 displays the indication that the alignment of the vehicle 100 with the trailer 104 is initiated to a user of the vehicle 100 (for example, via a display of the human machine interface 210).

Alternatively or in addition to, the electronic processor 220 detects when a new object (for example, a person) is present in the plurality of images based on the continuously updated three-dimensional model. When the electronic processor 220 detects a new object, the electronic processor 220 generates and transmits a new object warning for the user of the vehicle 100 (via the human machine interface 210). Alternatively or in addition to, the electronic processor automatically stops the vehicle 100 from automatically performing the vehicle maneuver when a new object is identified in the plurality of images.

In some embodiments, the electronic processor 220 determines a height of the trailer coupler 115. The electronic processor determines whether the hitch 110 of the vehicle 100 will collide with the trailer coupler 115 based on the height of the trailer coupler 115 and the height of the hitch 110. When the electronic processor 220 determines that the hitch 110 will collide with the trailer coupler 115, the electronic processor 220 generates a collision warning for the user of the vehicle 100 for display to the user of the vehicle 100 via the human machine interface 210.

Various features and advantages of certain embodiments are set forth in the following claims.

What is claimed is:

1. A system for aligning a vehicle with a trailer, the system comprising:
   an image sensor configured to collect a plurality of images; and
   an electronic processor configured to
      receive the plurality of images from the image sensor,
      determine a three-dimensional model of an area surrounding the vehicle using the plurality of images by analyzing the plurality of images using a structure from motion technique, each of the plurality of images being taken from different locations,
      control the vehicle to automatically perform a vehicle maneuver to align the vehicle with the trailer based on the three-dimensional model of the area surrounding the vehicle,
      determine when the vehicle is aligned with the trailer, and
      stop the vehicle from automatically performing the vehicle maneuver when the vehicle is aligned with the trailer.

2. The system of claim 1, wherein the electronic processor is further configured to determine whether the vehicle is within a starting region with respect to the trailer.

3. The system of claim 2, wherein the electronic processor is further configured to generate a visual representation of the starting region for display to a user of the vehicle via a human machine interface, wherein the visual representation is a highlighted area overlaid on the plurality of images.

4. The system of claim 3, wherein the electronic processor is configured to modify the visual representation to indicate whether the vehicle is within the starting region.

5. The system of claim 2, wherein, when the vehicle is not within the starting region with respect to the trailer, the electronic processor is configured to generate instructions for display to a user of the vehicle via a human machine interface for positioning the vehicle within the starting region.

6. The system of claim 1, wherein the electronic processor is configured to control the vehicle by controlling at least one selected from a group consisting of steering, acceleration, and braking of the vehicle to align the vehicle with the trailer.

7. The system of claim 1, wherein the three-dimensional model of the area surrounding the vehicle is a three-dimensional point cloud.

8. The system of claim 1, wherein the electronic processor is further configured to identify one or more objects within the plurality of images based on the three-dimensional model and vehicle odometry information.

9. The system of claim 1, wherein the electronic processor is further configured to continuously update the three-dimensional model while the vehicle is controlled to automatically perform the vehicle maneuver.

10. A method for aligning a vehicle with a trailer, the method comprising:
   receiving, with an electronic processor, a plurality of images from an image sensor;
   determining, with the electronic processor, whether the vehicle is within a starting region with respect to the trailer;
   determining, with the electronic processor, a three-dimensional model of an area surrounding the vehicle using the plurality of images by analyzing the plurality of images using a structure from motion technique, each of the plurality of images being taken from different locations;
   controlling, with the electronic processor, the vehicle to automatically perform a vehicle maneuver based on the three-dimensional model of the area surrounding the vehicle;
   determining, with the electronic processor, when the vehicle is aligned with the trailer; and
   stopping, with the electronic processor, the vehicle from automatically performing the vehicle maneuver when the vehicle is aligned with the trailer.

11. The method of claim 10, further comprising:
   receiving, from a human machine interface, a user input initiating the alignment of the vehicle with the trailer; and
   providing, to the human machine interface, an indication that an alignment of the vehicle with the trailer is initiated.

12. The method of claim 10, further comprising:
   continuously updating the three-dimensional model while the vehicle is controlled to automatically perform the vehicle maneuver.

13. The method of claim 12, further comprising:
detecting when a new object is present in the plurality of images based on the continuously updated three-dimensional model.

14. The method of claim 13, further comprising:
generating a new object warning for a user of the vehicle when the new object is identified in the plurality of images.

15. The method of claim 13, further comprising:
automatically stopping the vehicle from automatically performing the vehicle maneuver when the new object is identified in the plurality of images.

16. The method of claim 10, further comprising:
receiving a manual alignment input from a user of the vehicle, wherein the manual alignment input includes at least one input selected from a group consisting of a manual steering input, a manual acceleration input, and a manual braking input.

17. The method of claim 16, wherein controlling the vehicle to automatically perform the vehicle maneuver includes controlling the vehicle to automatically perform the vehicle maneuver based on the three-dimensional model and the manual alignment input.

18. The method of claim 10, further comprising:
determining a height of a trailer coupler of the trailer and a height of a hitch of the vehicle;
determining whether the hitch will collide with the trailer coupler based on the height of the trailer coupler and the height of the hitch; and
generating a collision warning for a user of the vehicle when the hitch will collide with the trailer coupler.

* * * * *